United States Patent Office 3,013,994
Patented Dec. 19, 1961

3,013,994
ANION EXCHANGE AND CHELATE EXCHANGE RESINOUS POLYMERS
Melvin J. Hatch, Midland, Mich., assignor to The Dow Chemical Company, Midland, Mich., a corporation of Delaware
No Drawing. Filed Apr. 6, 1959, Ser. No. 804,101
2 Claims. (Cl. 260—2.1)

This invention concerns anion exchange resinous polymers containing tris(hydroxymethyl)aminomethane (THMAM) groups, —NH—C(CH$_2$OH)$_3$, and their method of preparation.

In accordance with this invention it has now been discovered that water-insoluble polymeric vinylbenzyl THMAM resins are useful for exchanging anions and for absorbing (chelating) cupric ions from their aqueous solutions.

The resins of this invention are advantageously made by reacting a water insoluble but swellable vinylbenzyl sulfonium halide resin, halide being inclusive of chloride and bromide, or equivalent mineral acid salt, with THMAM in aqueous medium at a reaction temperature between about 50° and 100° C. for a time sufficient to displace sulfonium halide groups. Generally a reaction time of about 12 to 24 hours is required. At least an amount of THMAM sufficient to react with the sulfonium halide groups is used and preferably an excess. The amount of excess is not important since it can be recovered.

The polymeric benzyl sulfonium halide anion exchange resins advantageously used in making the ion and chelate exchange resins of this invention are the reaction products of vinylaryl polymers such as those of styrene, vinyltoluene, vinylxylene, chlorostyrene, dichlorostyrene, vinylnaphthalene, acenaphthene, etc., crosslinked, advantageously to the extent of between ca. 0.2 and 20 percent, with crosslinking agents such as divinylaromatic hydrocarbons and containing an average of between about 0.25 and 1.5 halomethyl groups per aromatic nucleus, and a sulfide of the group which contains up to two alkyl groups containing between one and four carbon atoms and/or, correspondingly, up to two hydroxyalkyl groups containing between two and four carbon atoms, i.e., dimethyl, diethyl, dipropyl, methyl hydroxyethyl, dibutyl sulfide; polymethylene sulfides and alkyl substituted polymethylene sulfides having 4 to 12 carbon atoms, from 4 to 8 of which are polymethylenic, the balance being from 1 to 4 carbon alkyl groups, pursuant to the procedure of copending U.S. patent application, Serial No. 769,545, filed October 27, 1958. The sulfonium anion exchange resin can be reacted in the halide form, as produced, or it can be converted to other ionic forms before reaction, e.g., the sulfate form.

In practice the vinylbenzyl sulfonium halide resin is heated in aqueous medium at a reaction temperature between about 50° and 100° C. with at least a sufficient amount of THMAM to displace the sulfonium halide groups and to substitute THMAM groups. In the reaction the amine hydrohalide salt which corresponds to the halide displaced, or equivalent salt, is formed. The reaction is represented as follows:

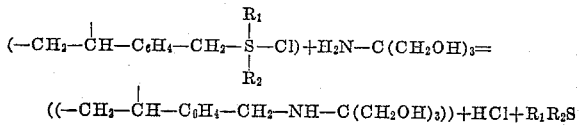

the first parenthesis representing a benzyl sulfonium halide polymer unit wherein R$_1$ and R$_2$ represent alkyl, hydroxyalkyl or polymethylene groups, as taught above. The hydrogen halide liberated reacts with the amino group to form the hydrohalide.

The following examples describe specific embodiments of this invention. They set forth the best mode contemplated by the inventor for carrying out his invention without being limitative thereof.

*Example 1*

A quantity of 575 ml. of a polyvinylbenzyl dimethylsulfonium chloride anion exchange resin, ca. 1 weight percent crosslinked with divinylbenzene and containing 0.38 meq./ml., wet settled volume, of sulfonium chloride groups, was heated at 75° to 90° C. for 16 hours with 100 g. THMAM dissolved in ca. 400 ml. of water. The reaction mixture was then filtered and the resulting beads were rinsed with water. Their wet settled volume was 200 ml. A portion of the beads was allowed to stand overnight with an excess of aqueous 2 N sodium hydroxide and was then rinsed with water. The beads, then in the basic form, had a capacity for aqueous dilute HCl of 0.84 meq./ml., wet settled volume and for Cu$^{++}$ absorption (complex or chelate formation) from aqueous dilute copper sulfate of 0.51 meq./ml. The exhausted resin is regenerated with excess aqueous dilute alkali or with excess aqueous dilute mineral acid followed by excess aqueous dilute alkali, in the first instance when used as an anion exchange resin and in the second instance when used as a complexing or chelate exchanging resin.

*Example 2*

A quantity of 50 ml. of sulfonium resin beads (polymeric vinylbenzyl dimethylsulfonium chloride, 16 percent crosslinked, 1.50 meq. Cl$^-$/ml. wet settled volume capacity), 20 g. of THMAM and 50 ml. of water was mixed together and heated on the steam bath at approximately 90° C. for 21 hours. The resulting beads were removed from the reaction medium and washed with water. Their wet settled volume was 40 ml. To 20 ml. of the wet settled beads was added ca. 100 ml. of 10 N HCl. After 5 days, the beads were removed and washed well with water. Their wet settled volume was then 20 ml. Potentiometric titration of a portion of the beads with silver nitrate indicated that they contained 0.7 meq./ml. of exchangeable Cl$^-$.

What is claimed is:

1. A water-insoluble resinous polymer the matrix of which consists essentially of polymeric vinylbenzyl units having from ca. 0.25 to 1.5 tris(hydroxymethyl)aminomethane groups per aryl nucleus, said polymer being crosslinked with between about 0.2 and 20 weight percent of a crosslinking agent having two vinylidene groups.

2. Water-insoluble resinous polymeric vinylbenzyl-tris-(hydroxymethyl)aminomethane crosslinked with ca. 1 weight percent of divinylbenzene and having ca. 0.25 to 1.5 tris(hydroxymethyl)aminomethane groups per aryl nucleus.

References Cited in the file of this patent
UNITED STATES PATENTS

| | | |
|---|---|---|
| 2,702,795 | Gilwood | Feb. 22, 1955 |
| 2,868,832 | Taylor | Jan. 13, 1959 |
| 2,895,925 | Hwa | July 21, 1959 |